United States Patent
Arai

Patent Number: 6,106,422
Date of Patent: Aug. 22, 2000

[54] POWER TRANSMISSION MEMBER AND MATERIAL THEREOF CONTAINING CARBON FIBER, AROMATIC POLYAMIDE FIBER AND GRAPHITE WITH PHENOL RESIN

[75] Inventor: Hirokazu Arai, Osaka, Japan

[73] Assignee: Koyo Seiko Co., Ltd., Osaka, Japan

[21] Appl. No.: 09/055,403

[22] Filed: May 6, 1998

[30] Foreign Application Priority Data

Apr. 11, 1997 [JP] Japan ................................. 9-093983

[51] Int. Cl.⁷ ............................. F16H 7/18; F16H 55/06; F16H 55/36; F16H 55/48; F16G 1/00
[52] U.S. Cl. .................... 474/100; 474/161; 474/166; 474/190; 474/201
[58] Field of Search ................... 474/100, 190, 474/191, 161, 166, 201, 207, 242, 244, 245, 265, 251, 250, 260, 263, 268; 524/600, 601; 525/425, 534, 928

[56] References Cited

U.S. PATENT DOCUMENTS

| | | | |
|---|---|---|---|
| 4,655,732 | 4/1987 | Takashima | 474/201 |
| 4,758,211 | 7/1988 | Hattori | 474/201 |
| 5,242,332 | 9/1993 | Douhairet et al. | 474/201 |
| 5,312,866 | 5/1994 | Tsutsumi et al. | 524/600 |
| 5,439,986 | 8/1995 | Hosogane et al. | 525/423 |
| 5,557,831 | 9/1996 | Kishi et al. | 28/167 |
| 5,571,875 | 11/1996 | Tsutsumi et al. | 525/425 |
| 5,610,217 | 3/1997 | Yarnell et al. | 474/191 |
| 5,759,647 | 6/1998 | Kuroda et al. | 428/34.5 |
| 5,797,819 | 8/1998 | Arai | 474/161 |
| 5,827,144 | 10/1998 | Stevenson | 474/201 |

*Primary Examiner*—David A. Bucci
*Assistant Examiner*—Matthew A. Kanese
*Attorney, Agent, or Firm*—Rabin & Champagne, P.C.

[57] ABSTRACT

A power transmission member is constructed by molding a resin material obtained by mixing a carbon fiber, an aromatic polyamide fiber, graphite, and talc with phenol resin. The preferred contents of the carbon fiber, the aromatic polyamide fiber, the graphite and the talc in the resin material are respectively 5 to 30% by weight, 5 to 15% by weight, 10 to 15% by weight, and 5 to 20% by weight. The phenol resin is filled with the carbon fiber and the aromatic polyamide fiber in order that the power transmission member has high strength and suitable flexibility. The phenol resin is filled with the graphite in order to suitably lower the coefficient of friction of the power transmission member to improve the wear resistance thereof. The talc is used for adjusting the frictional force of the power transmission member.

17 Claims, 1 Drawing Sheet

POWER TRANSMISSION MEMBER AND MATERIAL THEREOF CONTAINING CARBON FIBER, AROMATIC POLYAMIDE FIBER AND GRAPHITE WITH PHENOL RESIN

CROSS REFERENCE TO RELATED APPLICATION

This application claims priority benefits under 35 USC §119 of Japanese Patent Application Serial No. 9-93983 filed on Apr. 11, 1997, the disclosure of which is incorporated by reference.

BACKGROUND OF THE INVENTION

1. Field of the Invention

The present invention relates to power transmission members such as pulleys.

2. Description of Related Arts

In recent years, as a variable speed pulley so adapted that its effective diameter for a belt can be changed, a variable speed pulley of such a type that a flat belt is wound around a power transmission ring which can be eccentric from an axis of the pulley with it being fitted in a V-groove of the pulley has been provided. In this type of variable speed pulley, torque is transmitted between a member forming the V-groove and the power transmission ring. However, the area of a contact portion therebetween is narrow, so that surface pressure is significantly increased. In the above-mentioned contact portion, there exists a complicated contact state where rolling movement for torque transmission and sliding movement for eccentricity are mixed.

On the other hand, a metal was conventionally used as a material composing the power transmission ring, so that there were some problems. For example, the power transmission ring was seized, or the member forming the V-groove greatly wore.

For this problem, it is considered that resin be used for the power transmission ring. When a general resin is used for the power transmission ring, the power transmission ring greatly wears, and friction is unstable. As a result, consideration has been given to cases where the torque to be transmitted is not stabilized and the contact portion is melted.

In other words, as a resin molded member used for the power transmission ring, the member itself must have good compatibility with a counterpart member, although it is superior in wear resistance. Moreover, it must have a proper coefficient of friction which is stable irrespective of temperature.

In recent years, a pulley which was conventionally mainly composed of a metal has been replaced with one made of resin as automobile parts have been made small in size and light in weight and have been lowered in cost. A general pulley had the same problems as the above-mentioned power transmission ring.

In order to solve such problems, a power transmission member constructed by molding a resin material obtained by mixing an aromatic polyamide fiber, a non-linear inorganic filler and graphite with phenol resin has been considered (see JP-A-8-23-573, which is assigned to the assignee of the present application for example). The applicant of the present invention has encountered a case where the above material has insufficient in strength when it is applied to the power transmission ring. In such a case, it is considered that a reinforcing metal member is embedded in the resin material. If the reinforcing metal member is embedded, however, it costs much to manufacture the reinforcing metal member. Further, the cost for resin molding rises because the reinforming metal member is embedded.

SUMMARY OF THE INVENTION

An object of the present invention is to provide a power transmission member which does not easily wear, has good compatibility with a counterpart member, and has a proper coefficient of friction which is stable in terms of temperatures, and is high in strength and low in cost.

In order to attain the above-mentioned object, a preferred mode of the present invention is characterized in that the power transmission member is constructed by molding a resin material obtained by mixing a carbon fiber, an aromatic polyamide fiber and graphite with phenol resin.

The phenol resin has the advantage that it is superior in heat resistance and rigidity, and is not melted and softened even under high temperatures, while being difficult to use in a place having sliding because it is brittle and essentially has a very high coefficient of friction. The carbon fiber and the aromatic polyamide fiber are used as reinforming members in order to improve the brittleness of the phenol resin, and the graphite is used as a solid lubricant in order to improve the sliding properties thereof.

The carbon fiber contributes to an improvement in the mechanical strength of the resin material as a reinforcing material. An example of the carbon fiber is Toreca (Trade Name) manufactured by Toray Industries, Inc. The content of the carbon fiber in the resin material is preferably in the range of 5 to 30% by weight. The reason for this is that the resin material is liable to crack, for example, due to lack of strength if the content of the carbon fiber is less than 5% by weight, while being too hard, causing a counterpart member to wear if it exceeds 30% by weight.

The aromatic polyamide fiber not only contributes to an improvement in the mechanical strength of the resin material as a reinforcing material but also produces a large effect for an improvement in the wear resistance thereof. Further, it hardly has the function of causing the counterpart member to wear as seen in a conventional glass fiber or carbon fiber. Examples of the aromatic polyamide fiber include Kevler (Trade Name) and Nomex (Trade name) which are manufactured by Du Pont Co., Ltd. and Konex (Trade Name) which is manufactured by Teijin Limited. The content of the aromatic polyamide fiber in the resin material is preferably in the range of 5 to 15% by weight. The reason for this is that the resin material is liable to crack, for example, due to lack of strength if the content of the aromatic polyamide fiber is less than 5% by weight, and an improvement in a reinforcing effect is not recognized even if it exceeds 15% by weight in a case where the carbon fiber is mixed.

By thus mixing the carbon fiber and the aromatic polyamide fiber as reinforcing materials, the carbon fiber can compensate for lack of compressive strength of the aromatic polyamide fiber while preventing the wear of the counterpart member by the aromatic polyamide fiber, so that sufficient strength, for example, flexural strength can be given to the resin material. Particularly if the carbon fiber is mainly mixed as a reinforcing material and the aromatic polyamide fiber is mixed as its auxiliary, this is preferable for giving sufficient strength while preventing the wear of the counterpart member. If only the carbon fiber is mixed as a reinforcing material, this is not preferable because the counterpart member is liable to wear. If only the aromatic polyamide fiber is mixed as a reinforcing material, this is not preferable because sufficient strength, particularly flexural strength cannot be given to the resin material.

An example of the graphite is CPB 30 (Chuetsu Kokuen Kogyosho K. K.). It is preferable that the content of the graphite in the above-mentioned resin material is in the range of 10 to 15% by weight. The reason for this is that the resin material does not smoothly slide if the content of the graphite is less than 10% by weight, while being brittle if it exceeds 15% by weight.

If the non-linear inorganic filler is further mixed with the above-mentioned resin material, this is preferable for adjusting the frictional force of the resin material. Examples of the non-linear inorganic filler include at least one selected from a group consisting of calcium carbonate, magnesium carbonate, silica powder, talc, clay, alumina, mica, and gypsum. It is preferable that the content of the non-linear inorganic filler in the resin material is in the range of 5 to 20% by weight. The reason for this is that the resin material is increased in friction if the content of the non-linear inorganic filler is less than 5% by weight, while being brittle if it exceeds 20% by weight. Particularly if the non-linear inorganic filler is talc, this is preferable because the frictional force of the resin material is easy to adjust.

The foregoing and other objects, features, aspects and advantages of the present invention will become more apparent from the following detailed description of the present invention when taken in conjunction with the accompanying drawings.

DETAILED DESCRIPTION OF THE EMBODIMENT

Figure 1:
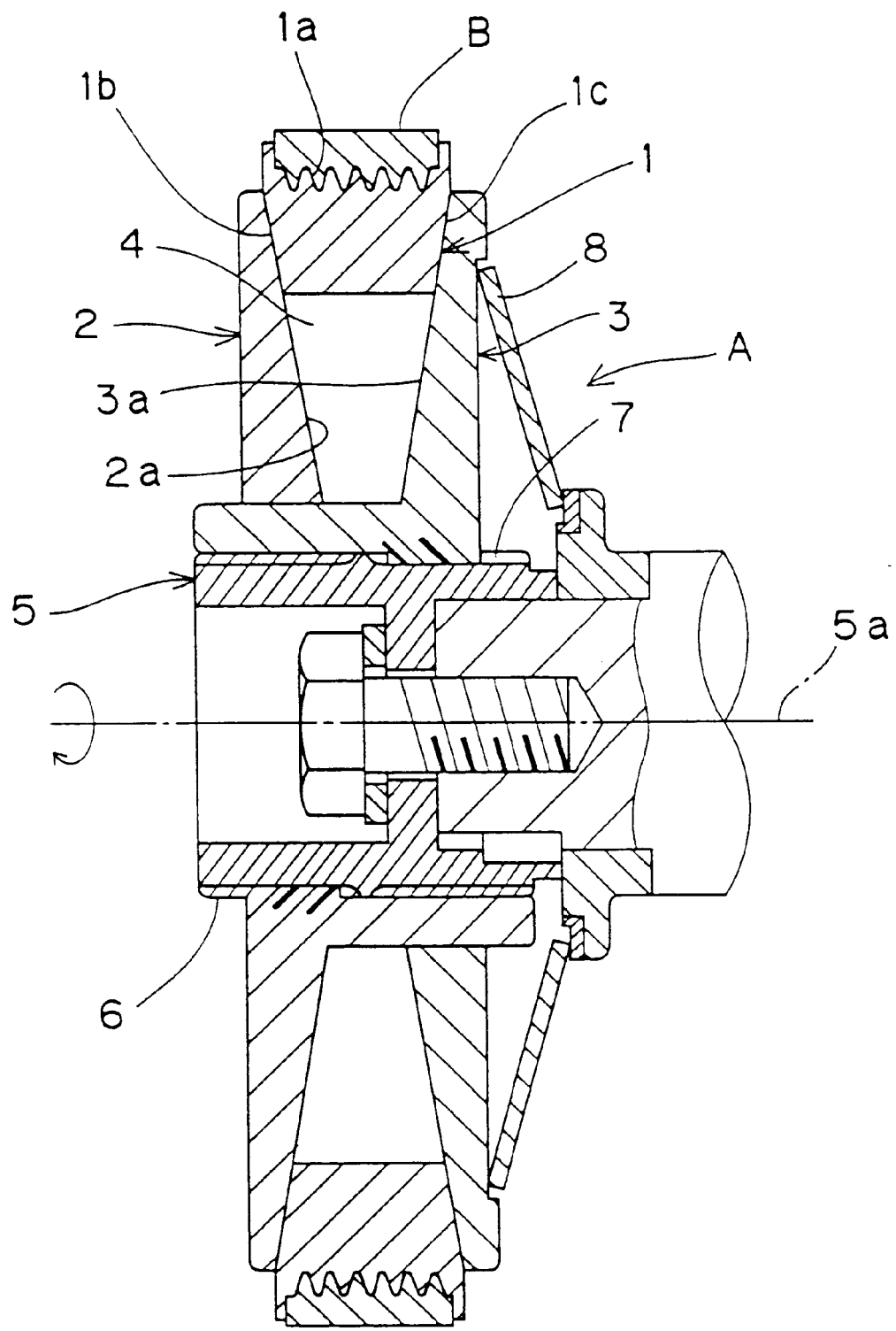
FIG. 1 is a cross-sectional view of a variable speed pulley including a power transmission ring as a power transmission member according to one embodiment of the present invention.

A preferred embodiment of the present invention will be described while referring to the accompanying drawing.

A carbon fiber, an aromatic polyamide fiber, a non-linear inorganic filler, and graphite are added to and kneaded with phenol resin which is base resin, to prepare molding resin.

The molding resin is then molded, to obtain a power transmission ring 1 serving as a power transmission member which is applied to a variable speed pulley A as shown in FIG. 1. The power transmission ring 1 is in the shape of an annulus which is approximately elliptical in cross section, to form a transmission surface 1a a flat belt B on its outer peripheral surface. A plurality of recesses which are engaged with the flat belt are formed in the circumferential direction on the transmission surface 1a. The power transmission ring 1 is fitted in a V-groove 4 defined between a pair of V-groove formed members 2 and 3 which can adjust the spacing therebetween. V-groove members 2 and 3 correspond to pulley main bodies. Tapered surfaces 1b and 1c respectively formed on both peripheral side surfaces of the power transmission ring 1 are respectively brought into contact with inclined surfaces 2a and 3a of the V-groove formed members 2 and 3. The tapered surfaces 1b and 1c are portions in which a very complicated contact state where rolling movement for torque transmission and sliding movement for eccentricity are mixed.

In the variable speed pulley A, screw portions 6 and 7 opposite to each other and having the same pitch are formed around a cylindrical rotating shaft 5 driven by an engine. The V-groove formed members 2 and 3 are respectively fitted in the screw portions 6 and 7, and are connected to each other by spline fitting so as to be integrally rotatable. Reference numeral 8 denotes a conical spring urged in the direction in which both the V-groove formed members 2 and 3 are in close proximity to each other. In the variable speed pulley A, the tension of a belt is increased, to make the power transmission ring 1 eccentric from an axis 5a of the rotating shaft 5 to change the contact diameter of the belt.

The carbon fiber contributes to an improvement in the mechanical strength of the resin material as a reinforcing material. The content of the carbon fiber in the resin material in preferably in the range of 5 to 30% by weight, more preferably in the range of 10 to 20% by weight, and still more preferably in the range of 15% by weight. The reason for this is that the resin material is liable to crack, for example, due to lack of strength if the content of the carbon fiber is less than 5% by weight, while being too hard, causing a counterpart member to wear if it exceeds 30% by weight. An example of the carbon fiber is Toreca (Trade Name) manufactured by Toray Industries, Inc.

The aromatic polyamide fiber not only contributes to an improvement in the mechanical strength of the resin material as a reinforcing material but also produces a large effect for an improvement in the wear resistance thereof. Further, it hardly causes the counterpart member to wear as seen in a conventional glass fiber or carbon fiber. The content of the aromatic polyamide fiber in the resin material is preferably in the range of 5 to 15% by weight. The reason for this is that the resin material is liable to crack, for example, due to lack of strength if the content of the aromatic polyamide fiber is less than 5% by weight, and an improvement in a reinforcing effect is not recognized even if it exceeds 15% by weight in a case where the carbon fiber is mixed. Examples of the aromatic polyamide fiber include Kevler (Trade Name) and Nomex (Trade Name) which are manufactured by Du Pont Co., Ltd. and Konex (Trade Name) which is manufactured by Teijin Limited.

By thus mixing the carbon fiber and the aromatic polyamide fiber as reinforcing materials, the carbon fiber can compensate for lack of the compressive strength of the aromatic polyamide fiber while preventing the wear of the counterpart member by the aromatic polyamide fiber, so that sufficient strength, for example, flexural strength can be given to the resin material. Particularly if the carbon fiber is mainly mixed as a reinforming member and the aromatic polyamide fiber is mixed as its auxiliary, this is preferable for giving sufficient strength while preventing wear on the counterpart member. If only the carbon fiber is mixed as a reinforcing material, this is not preferable because the counterpart member is liable to wear. If only the aromatic polyamide fiber is mixed as a reinforcing material, this is not preferable because sufficient strength, particularly flexural strength, cannot be given to the resin material.

An example of the graphite used as an additive for increasing the sliding properties of the resin material to improve the wear resistance thereof is CPB 30 (Chuetsu Kokuen Kogyosho K. K.). It is preferable that the content of the graphite in the resin material is in the range of 10 to 15% by weight. The reason for this is that the resin material does not smoothly slide if the content of the graphite is less than 10% by weight, while being brittle if it exceeds 15% by weight.

Examples of the non-linear inorganic filler include at least one selected from a group consisting of calcium carbonate, magnesium carbonate, silica powder, talc, clay, alumina, mica, and gypsum. It is preferable that the content of the non-linear inorganic filler in the resin material is in the range of 5 to 20% by weight. The reason for this is that the resin material is increased in friction if the content of the non-linear inorganic filler is less than 5% by weight, while being brittle if it exceeds 20% by weight. Particularly if the non-linear inorganic filler is talc, this is preferable because the frictional force of the resin material is easy to adjust.

In the present embodiment, the resin material obtained by mixing the carbon fiber, the aromatic polyamide fiber and the graphite with the phenol resin is used. Therefore, the resin material itself has good compatibility with the counterpart member, although it is high in strength and superior in wear resistance, and has a coefficient of friction which is stable, irrespective of temperature, as a molded member. Consequently, the resin material is suitable for application to a belt guide member (a power transmission member) such as a power transmission ring.

The contents of the carbon fiber, the aromatic polyamide fiber, and the graphite in the phenol resin are respectively in the range of 5 to 30% by weight, in the range of 5 to 15% by weight, and is in the range of 10 to 15% by weight, so that the wear resistance of the resin material can be further improved to make the coefficient of friction thereof more stable.

Particularly, a power transmission ring high in strength can be obtained, so that a reinforcing metal member need not be embedded in the resin material composing the power transmission ring. As a result, it is possible to construct the power transmission ring 1 lighter in weight, as compared with the power transmission ring in which the reinforcing metal member is embedded in the resin material, so that the effect of a centrifugal force can be reduced in a case where the power transmission ring 1 is made eccentric as described above. As a result, vibration of the power transmission ring 1 can be restrained. Consequently, the power transmission ring 1 can be applied to the variable speed pulley A so that the latter can be stably operated.

If the non-linear inorganic filler is further mixed with the resin material, this is preferable for adjusting the frictional force of the resin material, so that the molded member has a suitable coefficient of friction. It is preferable that the content of the non-linear inorganic filler in the resin material is in the range of 5 to 20% by weight. Particularly if the non-linear inorganic filler is talc, the frictional force of the resin material is easy to adjust.

The present invention is applicable to a power transmission member such as a belt guide member, for example, a general pulley. In addition thereto, various changes can be made in the range of the present invention.

EXAMPLES 1 to 5 and COMPARATIVE EXAMPLES 1 to 5

Each of various types of fillers was added to and kneaded with novolak-type phenol resin which is the base resin, in the ratio shown in Table 1 to prepare molding resin, after which the molding resin was molded. As a result, power transmission rings in examples 1 to 5 and comparative examples 1 to 5 were obtained.

In the examples 1 to 5 and the comparative examples 1 and 2, the phenol resin was filled with a carbon fiber, an aromatic polyamide fiber, graphite and talc. In the comparative example 3, the phenol resin was filled with an aromatic polyamide fiber, graphite and talc. In the comparative example 4, the phenol resin was filled with a carbon fiber, graphite and talc. In the comparative example 5, the phenol resin was filled with a carbon fiber and an aromatic polyamide fiber. In Table 1, the aromatic polyamide fiber was indicated by aramide F, and the carbon fiber was indicated by carbon F.

TABLE 1

| | | example | | | | | comparative example | | | | |
|---|---|---|---|---|---|---|---|---|---|---|---|
| | | 1 | 2 | 3 | 4 | 5 | 1 | 2 | 3 | 4 | 5 |
| base resin | | phenol resin (novolak-type) | | | | | | | | | |
| filler/ | carbon F | 20 | 20 | 30 | 5 | 15 | 35 | 3 | — | 35 | 20 |
| % by | aramide F | 10 | 10 | 8 | 15 | 5 | 3 | 18 | 20 | — | 10 |
| weight | graphite | 15 | 15 | 12 | 10 | 15 | 18 | 8 | 15 | 15 | — |
| | talc | 13 | 10 | 10 | 5 | 20 | 3 | 23 | 13 | 10 | — |
| wear resistance | | ○ | ○ | ○ | ○ | ○ | x | ○ | ○ | ○ | ○ |
| sample temperature | | ○ | ○ | ○ | ○ | ○ | ○ | x | ○ | ○ | x |
| coefficient of friction | | ○ | ○ | ○ | ○ | ○ | x | x | ○ | ○ | x |
| compatibility with counterpart | | ○ | ○ | ○ | ○ | ○ | x | ○ | ○ | x | ○ |
| vibration | | ○ | ○ | ○ | ○ | ○ | ○ | x | ○ | ○ | x |
| flexural strength | | ◎ | ◎ | ◎ | ○ | ◎ | ○ | x | x | ◎ | ○ |

The power transmission rings in the examples 1 to 5 and the comparative examples 1 to 5 were used for the variable speed pulley, to perform evaluation tests on wear resistance, a sample temperature, a coefficient of friction, compatibility with a counterpart and vibration, and further perform tests on flexural strength. From the tests, results shown in Table 1 were obtained.

The tests were performed by pressing, in two disks having different peripheral speeds, their outer peripheral parts against each other to forcably slide a contact point, to measure the sample temperature, the coefficient of friction and the vibration of each of the disks. The amount of wear of the disk was measured, to evaluate the wear resistance and the compatibility with a counterpart. A part of the power transmission ring was used as a sample piece, to measure the flexural strength.

As a criterion for judging the wear resistance in the results of the tests, a case where the disk did not wear was indicated by ○, and a case where it wore was indicated by x. As a criterion for judgment of the sample temperature, a case where the sample temperature was not more than 60° C. was indicated by ○, and a case where it exceeded 60° C. was indicated by x.

As a criterion for judgment of the coefficient of friction, a case where the coefficient of friction was 0.2 to 0.4 which did not vary was indicated by ○, and the other case was indicated by x. As a criterion for judgment of the compatibility with a counterpart, a case where a counterpart disk did not wear was indicated by ○, and a case where it wore was indicated by x. As a criterion for judgment of the vibration, a case where vibration was generated was indicated by x.

As a criterion for judging the flexural strength, a case where the flexural strength was not less than 85 MPa was indicated by ◎, a case where it was less than 85 MPa and not less than 75 MPa was indicated by ○, and a case where it was less than 75 MPa was indicated by x. The flexural strength required as the power transmission ring was not less than 75 MPa.

The following were made clear from the results of the tests shown in Table 1:

(1) From the results of the tests in the examples 1 to 5, if the content of the carbon fiber was 5 to 30% by weight, the content of the aramide fiber (the aromatic polyamide fiber) was 5 to 15% by weight, the content of the graphite was 10 to 15% by weight, and the content of the non-linear inorganic filler was 5 to 20% by weight, then the power transmission ring was superior in all aspects, that is, the wear resistance, the sample temperature, the coefficient of friction, the compatibility with a counterpart, the vibration, and the flexural strength.

(2) In the comparative example 1, the content of the carbon fiber was as large as 35% by weight, and the content of the aramide fiber was as small as 3% by weight, so that there was no problem in the flexural strength of the power transmission ring. However, the compatibility thereof with a counterpart was large because the content of the carbon fiber was as large as 35% by weight. Moreover, the content of the graphite was as large as 18% by weight, and the content of the talc was as small as 3% by weight, so that the coefficient of friction of the power transmission ring was too low.

(3) In the comparative example 2, the content of the carbon fiber was as small as 3% by weight, and the content of the aramide fiber was as large as 18% by weight, so that the power transmission ring was insufficient in flexural strength. Further, the content of the talc was as large as 23% by weight, so that the power transmission ring was brittle, and was insufficient in strength. Although the content of the aramide fiber was as large as 18% by weight, the aramide fiber did not have as good a reinforcing effect as did the carbon fiber, so that the power transmission ring was insufficient in strength. The content of the graphite was as small as 8% by weight, so that the power transmission ring was inferior because the coefficient of friction thereof was increased and the sample temperature thereof was raised. Further, the power transmission ring vibrated.

(4) In the comparative example 3, the content of the aramide fiber was as large as 20% by weight, but no carbon fiber was included, so that the power transmission ring was insufficient in flexural strength.

(5) In the comparative example 4, the content of the carbon fiber was as large as 35% by weight, and no aramide fiber was included. However, there was no problem in the strength of the power transmission ring. However, the content of the carbon fiber was as large as 35% by weight, so that the power transmission ring had good compatibility with a counterpart.

(6) In the comparative example 5, the contents of the carbon fiber and the aramide fiber were respectively in the preferable ranges, so that there was no problem in the strength of the power transmission ring. However, no graphite and talc were included, so that the power transmission ring was inferior because the coefficient of friction thereof was increased and the sample temperature thereof was raised. Further, the power transmission ring vibrated.

Although the present invention has been described and illustrated in detail, it to be clearly understood that the same is by way of illustration and example only and is not to be taken by way of limitation, the spirit and scope of the present invention being limited only by the terms of the appended claims.

What is claimed is:

1. A molded power transmission member made of a phenol resin-based material obtained by mixing additives, including a carbon fiber, an aromatic polyamide fiber and graphite, with phenol resin, wherein the contents of the carbon fiber, the aromatic polyamide fiber, and the graphite are respectively in a range of 5 to 30% by weight, 5 to 15% by weight, and 10 to 15% by weight.

2. The power transmission member according to claim 1, wherein the content of the carbon fiber is larger than the content of the aromatic polyamide fiber.

3. The power transmission member according to claim 1, wherein a non-linear inorganic filler is further mixed with the phenol resin.

4. The power transmission member according to claim 3, wherein the content of the non-linear inorganic filler is in a range of 5 to 20% by weight.

5. The power transmission member according to claim 4, wherein
the non-linear inorganic filler includes talc.

6. The power transmission member according to claim 1, wherein the power transmission member is composed of a molded circular ring, which is approximately elliptical in cross section, having an outer peripheral surface for fittedly receiving a belt to be held so as to be capable of being eccentric between a pair of tapered-shaped pulley main bodies relatively movable in an axial direction.

7. A molded power transmission member according to claim 1, wherein the content by weight of the phenol resin is greater than the content by weight of any of the additives.

8. A molded power transmission member according to claim 7, wherein the content by weight of the phenol resin is at least 40%.

9. A molded power transmission member according to claim 8, wherein the content by weight of the phenol resin is in the range of 40 to 65%.

10. A molded power transmission member comprising a mixture of a base material and additives, the base material consisting of phenol resin, the additives including 5 to 30% by weight of carbon fiber, 5 to 15% by weight of aromatic polyamide fiber, 10 to 15% by weight of graphite.

11. A molded power transmission member according to claim 10, wherein the content by weight of the phenol resin is greater than the content by weight of any of the additives.

12. A molded power transmission member according to claim 11, wherein the content by weight of the phenol resin is at least 40%.

13. A molded power transmission member according to claim 12, wherein the content by weight of the phenol resin is in the range of 40 to 65%.

14. A power transmission device, comprising
a molded circular ring, approximately elliptical in cross section and having an outer peripheral surface, said ring being formed of a mixture of a base material and additives, the base material consisting of phenol resin, the additives including 5 to 30% by weight of carbon fiber, 5 to 15% by weight of aromatic polyamide fiber, 10 to 15% by weight of graphite; and
a belt fitted on said outer peripheral surface and held thereon so as to be capable of being eccentric, between a pair of tapered-shaped pulley main bodies relatively movable in an axial direction.

15. A molded power transmission member according to claim 14, wherein the content by weight of the phenol resin is greater than the content by weight of any of the additives.

16. A molded power transmission member according to claim 15, wherein the content by weight of the phenol resin is at least 40%.

17. A molded power transmission member according to claim 16, wherein the content by weight of the phenol resin is in the range of 40 to 65%.

* * * * *